(12) United States Patent
Wolpert et al.

(10) Patent No.: US 6,354,171 B1
(45) Date of Patent: Mar. 12, 2002

(54) PEDAL ARRANGEMENT FOR VEHICLES

(75) Inventors: Engelbert Wolpert, Stuttgart; Martin Müller, Friolzheim, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/587,475

(22) Filed: Jun. 5, 2000

(30) Foreign Application Priority Data

Jun. 11, 1999 (DE) .......................................... 199 26 604

(51) Int. Cl.[7] ............................. G05G 1/14; B60K 28/14
(52) U.S. Cl. ........................................................ 74/512
(58) Field of Search .................... 74/512, 560; 180/274, 180/275

(56) References Cited

U.S. PATENT DOCUMENTS

| 6,101,894 A | * | 8/2000 | Tiemann et al. | ............... 74/512 |
| 6,112,616 A | * | 9/2000 | Schonlau et al. | ............. 74/512 |
| 6,209,416 B1 | * | 4/2001 | Tiemann et al. | ............... 74/512 |

FOREIGN PATENT DOCUMENTS

| DE | 2841988 | | 6/1982 | | |
| DE | 3533420 | | 3/1987 | | |
| DE | 4340633 | * | 6/1994 | ................... | 74/512 |
| DE | 4409235 | * | 10/1994 | ................... | 74/512 |
| DE | 19515852 | | 11/1995 | | |
| DE | 19617372 | | 1/1998 | | |

* cited by examiner

Primary Examiner—Mary Ann Green
(74) Attorney, Agent, or Firm—Crowell & Moring LLP

(57) ABSTRACT

A pedal arrangement for a footwell of a motor vehicle. The pedal arrangement includes a bearing bracket operatively connected to a front wall of the motor vehicle. A pedal pivot shaft is provided on the bearing bracket at an upper bracket segment. The upper bracket segment is capable of being torn off from the remainder of the bearing bracket. At least one pedal lever is arranged pivotally on the pivot shaft. A tear-off lever element is capable of being engaged with an abutment attached to the motor vehicle and spaced from a floor and the front wall of the motor vehicle. In the event of a collision, the upper bracket segment is at least partially torn away from the remainder of the bearing bracket such that the at least one pedal lever is displaced away from the driver reducing the possibility of injury to the driver.

9 Claims, 3 Drawing Sheets

PEDAL ARRANGEMENT FOR VEHICLES

CROSS REFERENCE TO RELATED APPLICATION

Priority is claimed with respect to German Application No. 199 26 604.2-22 filed in Germany on Jun. 11, 1999, the disclosure of which is incorporated herein by reference.

BACKGROUND OF THE INVENTION

The invention relates to a pedal arrangement in the footwell of a motor vehicle.

It is known to configure the pedal arrangement in the footwell of motor vehicles in such a manner that in the event of a load caused by a head-on collision, at least the brake pedal, which is coupled to a brake-activating unit, is uncoupled from the latter in order to avoid movement of the pedal into the footwell (cf., for example, DE 35 33 420 C2; DE 19 51 58 52 A1; DE 19 61 73 72 C1).

DE 28 41 988 C2 also discloses a pedal arrangement in which, the bearing bracket which supports a pedal lever in a suspended manner and such that it can pivot can, in the event of a crash, be torn off from an upper fastening point in the engine compartment and can be pivoted about a lower fastening point in such a manner that the pedal is therefore displaced in the direction of the front wall of the vehicle interior.

This construction requires the pedal bearing bracket to be arranged within the engine compartment and at such a distance in front of the front wall separating the said engine compartment from the vehicle interior that should a corresponding accident occur, there is sufficient yielding space available for the said bearing bracket to be displaced by pivoting.

Accordingly, this constructional solution requires a relatively large clearance volume through an upper front-wall part correspondingly facing into the vehicle interior, with the pedal lever having to be guided through the front wall, in a correspondingly displaceable and sealed manner.

The object of the invention is to specify a pedal arrangement which arrangement does not require any installation space in the engine compartment, provides good accessibility to the pedal mounting and, in the event of a front-wall intrusion, provides further distance from the driver's legs and/or feet.

SUMMARY OF THE INVENTION

According to the invention, this object is achieved by the features of the present invention as described and claimed hereinafter.

According to the invention, a bearing bracket, is fitted to the front wall, on the vehicle interior side, the mounting of the pedal on an upper bearing-bracket segment, and also the equipping thereof with a tear-off element which extends in the opposite direction with respect to the front wall and, in the event of the bearing bracket being displaced into the footwell because of an intrusion of the front wall, strikes against a stationary abutment, causing the following:

When a front wall is pushed back because of an accident, the deformation of the said front wall is often greater in the wall region in the vicinity of the floor than in the upper wall region. Therefore, in the event of a deformation of this type, a bearing body mounted on the inside of the front wall normally rotates upwards about a vehicle transverse axis, as a result of which the pedal is pivoted into the footwell toward the driver.

The bearing body is prevented from rotating in this manner by the interaction of the tear-off element, which is provided according to the invention, with the abutment, by the interaction of these parts subjecting the bearing bracket to a rupture load which causes that segment of the bearing bracket which bears the pedal pivot shaft to break away from its remaining part. In this forced rupture, the pedal-lever bearing point is therefore torn out of the bearing bracket, the at least one pedal lever falling loosely downwards.

A preferred refinement of the invention is characterized in that the tear-off element is a double-armed lever whose one lever arm can be placed against a first stop of that bearing bracket part which remains against the front wall during the tearing off and which is at a low location with respect to the lever pivot shaft, and in that the abutment, in the event of a crash, runs in a curved manner onto the upper side, curved sloping downwards towards the lever end, of the other lever arm of the double-armed lever. By means of the design of the tear-off element as a double lever in conjunction with the first stop assigned to the said element at the bracket end, the rupture is brought about by a torque acting on the bearing bracket.

The bearing bracket may, for example, be configured in such a manner that the rupture will take place along a defined rupture section. For this purpose, the bearing bracket may, for example, have appropriate weak points in the material.

In this case, the mutually interacting, curved surfaces of the double-armed lever and abutment ensure that even when the bearing bracket is displaced backwards in a purely translatory manner, the double-armed lever is always caused to rotate in a downward direction.

A particularly suitable construction is characterized in that a second stop is provided on the bearing bracket of the rupture zone and above the first stop, and the lever arm acting on the bearing bracket is designed in such a manner that when the double-armed lever is pivoted, the second stop can first of all be torn off from the bearing bracket by this lever arm in order to form a predetermined rupture point. In this case, in a head-on collision a predetermined rupture point is first of all produced by the double-armed lever in interaction with the second stop on the bearing bracket. This provides the advantage of constructionally configuring the bearing bracket in such a manner that the actual rupture can be obtained under favourable bending and compression loads on the lever-form tear-off element.

The arrangement of the double-armed lever on the pedal pivot shaft offers the advantage of being able to dispense with the arrangement of special mounting means for the said lever on the bearing bracket.

Further advantageous refinements of the invention are characterized in that the double-armed lever is in the form of an inverted U in cross section and fits over a web-like, upper saddle of the bearing bracket, and in that the two stops per U-limb of the lever arm assigned to them of the double-armed lever each have a stop lug protruding laterally from the bearing bracket. In addition, provision is made for at least one of the stop lugs of the first stop to simultaneously form an abutment for fixing the pedal in its non-depressed ready position. In one development, provision is made for that lever arm of the double-armed lever which is assigned to the stops to grip with its U-limbs, in each case by means of a front projecting piece, under the stop lugs of the second stop and to be brought into engagement with the said stop lugs. According to the invention, the pedal arrangement has a spring element which attempts to keep the double-armed lever and the front projecting pieces of its lever arm continuously in engagement with the stop lugs of the second stop, while the stop lugs of the first stop do not come into contact with the U-limbs.

BRIEF DESCRIPTION OF THE DRAWINGS

The drawing is a representation of an exemplary embodiment of the invention, in which.

DETAILED DESCRIPTION OF THE PREFERRED EMBODIMENTS

Figure 1:
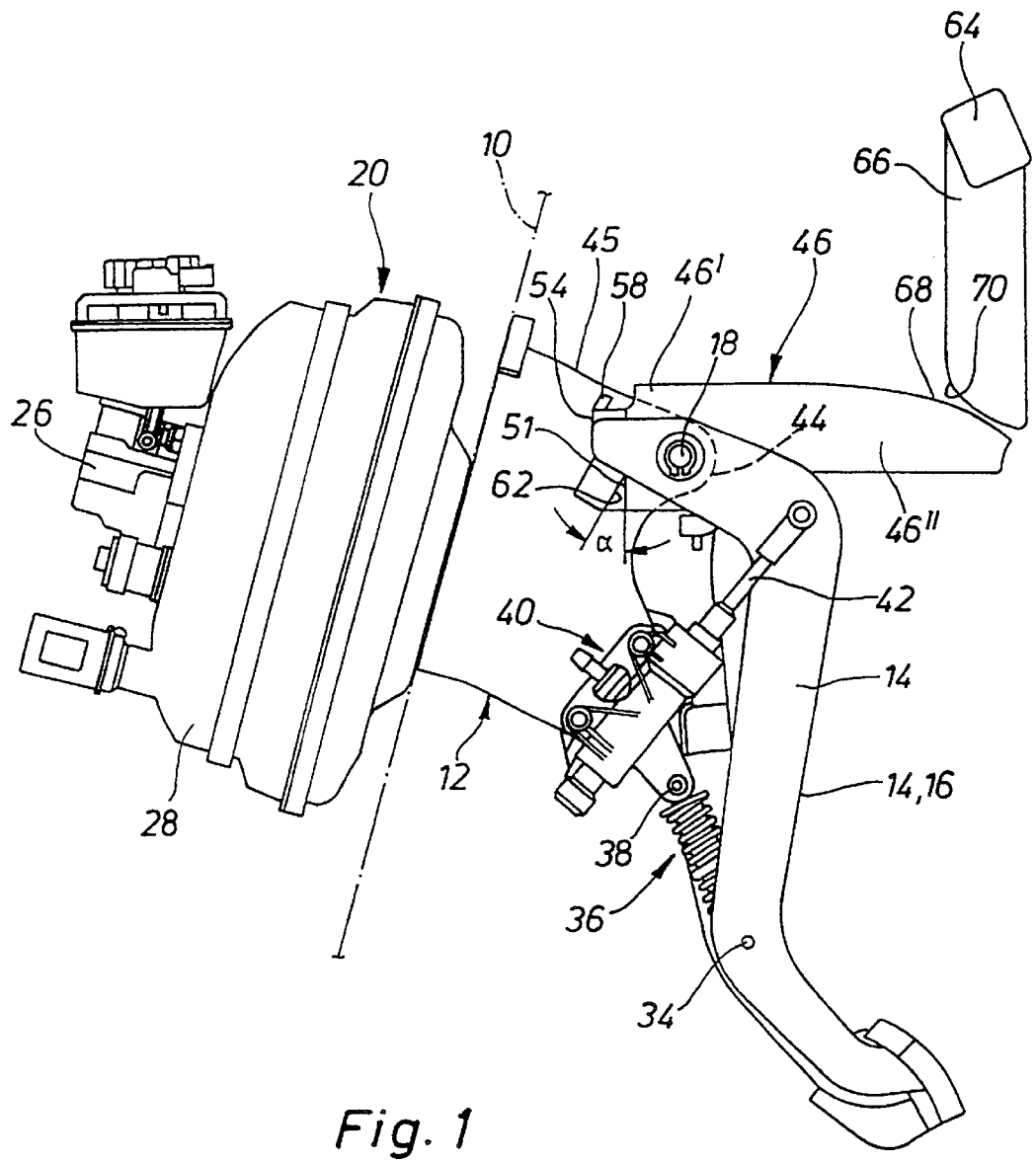
FIG. 1 shows a side view of a pedal arrangement, in the installation position in a motor vehicle.
Figure 2:
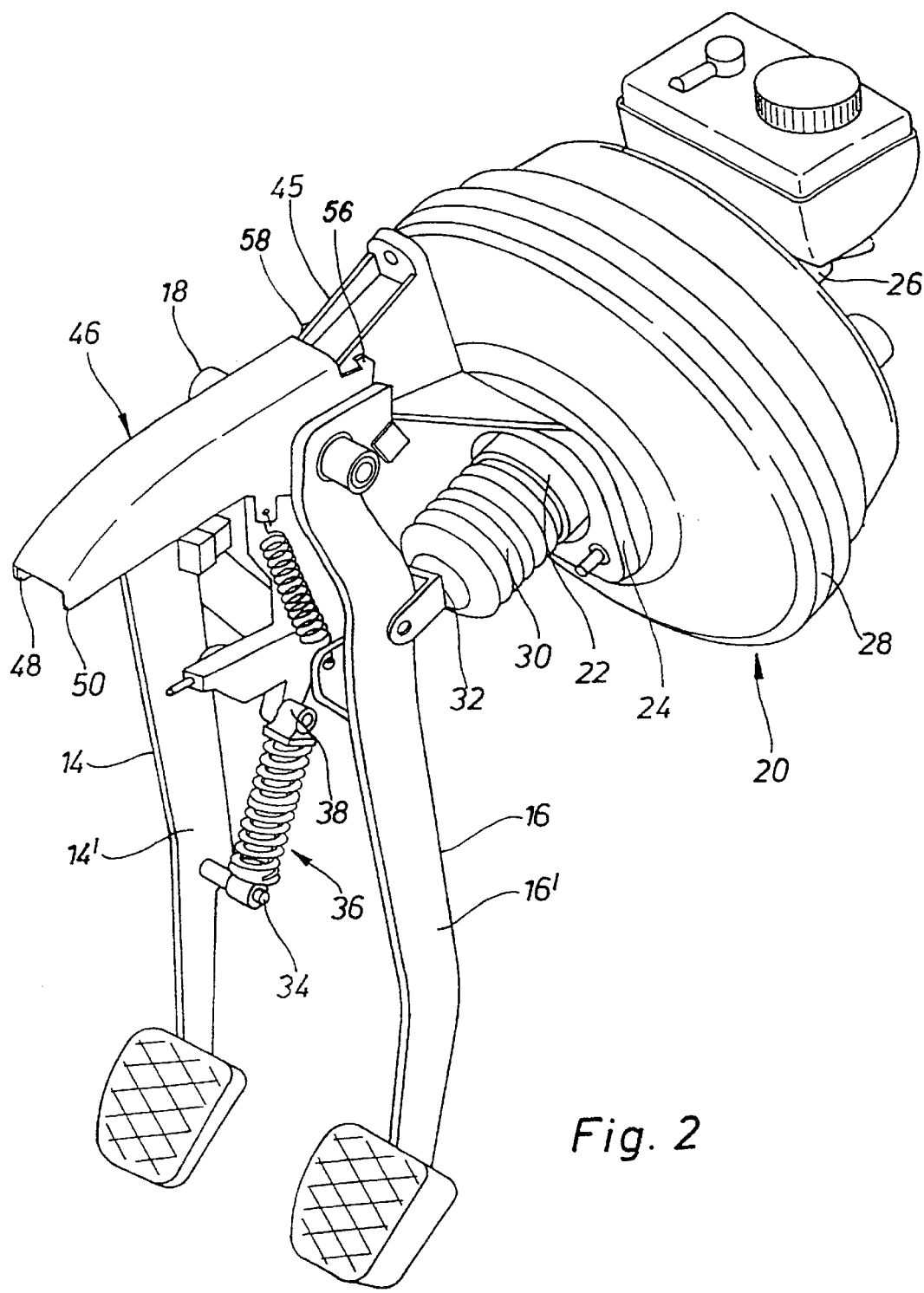
FIG. 2 shows a perspective representation of the pedal arrangement in conjunction with a braking unit, viewed obliquely from above.
Figure 3:
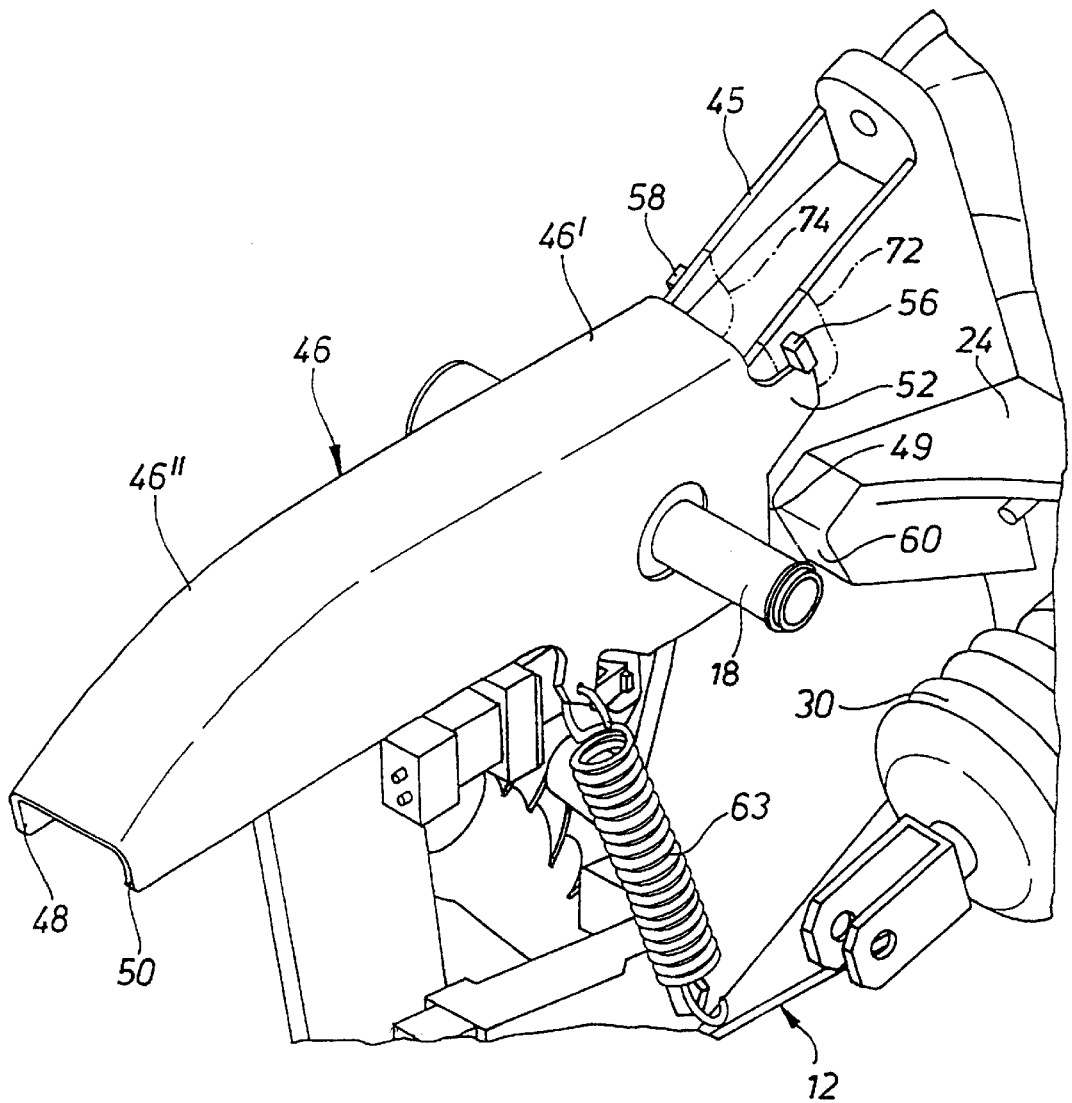
FIG. 3 shows a detail of the pedal arrangement according to FIG. 2 on an enlarged scale, with one pedal removed.

In FIG. 1, a front wall which separates the engine compartment from the vehicle interior of a motor vehicle is denoted by dash-dotted lines and by 10. 12 denotes as a whole a bearing bracket which is screwed onto the front wall 10 and is intended, for example, for a brake pedal 14 and a clutch pedal 16 which are both mounted in a suspended and pivotable manner on a common, horizontal pivot shaft 18 which is parallel to the front wall 10.

20 denotes as a whole a brake unit which is provided on the front wall 10 on the engine-compartment side and passes with a guide stub 22 through the front wall 10 and also through a receiving plate 24 integrally formed laterally on the bearing bracket 12, a brake servo 28 of the brake unit 20, which brake servo bears a main brake cylinder 26, being secured to this receiving plate 24.

A compression rod 32, which is surrounded by a sealing sleeve 30, of the brake servo 28 is guided displaceably in the guide stub 22, which is coupled to the brake lever 16' of the brake pedal 16.

In the lower region, the pedal lever 14' of the clutch pedal 14 bears, in a known manner, an axle journal 34 on which is mounted a lever-restoring element 36 which can be changed in length, is actuated by a spring and is held on an axle journal 38 of the bearing bracket 12 by an upper bearing lug.

By means of the clutch pedal 14, in a similarly known manner, a clutch cylinder 40, which is secured to the bearing bracket 12, can be activated via a piston rod 42.

The pedal pivot shaft 18 passes through a receiving lug 44 of the bearing bracket 12, which lug, as FIG. 1 shows, is formed integrally on the said bearing bracket, protruding rearwards therefrom at the upper bracket end, which faces away from the front wall 10. In this case, this receiving lug 44 simultaneously forms the rear end of an upper bearing-bracket saddle 45. On both sides of the receiving lug 44, one of the pedals 14, 16 in each case is mounted on the pivot shaft 18.

46 denotes as a whole a double-armed lever which forms a tear-off element, is preferably seated on the pivot shaft 18 and extends away essentially horizontally from the bearing bracket 12 in an opposite direction with respect to the front wall.

The lever 46 is preferably designed in the form of an inverted U in cross section and partially fits over that rear end piece of the bearing-bracket saddle 45 which has the receiving lug 44. Its lever arm 46' which faces the end wall 10 is configured to be relatively short, a respective projecting piece 52 and 54 being integrally formed on the U-limbs 48, 50 of the lever 46, specifically on their front edge 49 and 51, respectively, facing the front wall 10.

The projecting pieces 52, 54 each grip under a stop lug 56 and 58, respectively, provided laterally on the bearing-bracket saddle 45.

Furthermore, each front edge 49 and 51, respectively, of the U-limbs 48, 50 of the lever arm 46' is assigned a further stop lug 60 and 62, respectively, on the bearing bracket 12, laterally and below the pivot shaft 18 at an acute angle α (FIG. 1).

63 denotes a tension spring which acts on the lever arm 46" and keeps the lever projecting pieces 52 and 54 in engagement with the stop lugs 56, 58.

In the footwell of the motor vehicle, the rear lever arm 46" of the lever 46 is assigned an abutment 66 which is spaced apart from the floor of the said motor vehicle and from the front wall 10, is preferably fixed in a stationary manner to a dashboard cross-member 64, is situated above the rear end of the lever arm 46" and does not come into contact with the latter in the normal operating state of the motor vehicle.

In the event of the front wall 10 intruding, for example as a consequence of a head-on collision, the following then happens:

Since conventionally the deformation of the front wall is most pronounced in the foot region, the bearing bracket 12 together with the brake unit 20 is thereby rotated, according to FIG. 1, counterclockwise. As a result, the lever arm 46" of the double-armed lever 46 is placed, by means of a back surface 68 which is preferably curved to the rear and downwards, onto a sufficiently curved mating surface 70 of the abutment 66, with the consequence that a relative movement takes place at the bearing point between the bearing bracket 12 and lever 46. This results in the lever arm 46', according to FIG. 1, which grips under the stop lugs 56, 58, pivoting in the clockwise direction and its projecting pieces 52, 54 thereby tearing off the stop lugs 56, 58 and the material parts surrounding the latter from the bearing-bracket saddle 54, so that a considerable weakening of the saddle is brought about by notches 72, 74 which are produced and are indicated by dash-dotted lines.

As the relative rotation continues, as a consequence of being further subjected to a force because of the intrusion of the front wall, the front edges 49, 51 of the U-limbs 48, 50 of the lever arm 46' finally come into contact with the stop lugs 60, 62, the torque which is in effect, assisted by the previously produced notches 72, 74, causing a forced rupture in which the receiving lug 44, which holds the pivot shaft 18, is torn off from the bearing-bracket saddle 45 and the pedals 14, 16 thereby fall down or remain hanging loosely on the compression rod 32 of the brake unit 20 and/or on the clutch master cylinder.

The stop lugs 60, 62 preferably also form a respective stop for the pedal levers 14', 16', which stops prevent the pedals 14, 16 from being able to pivot further to the rear beyond their non-depressed position.

The bearing bracket 12 preferably forms a shaped body made of a metal injection moulding which is distinguished by correspondingly favourable mechanical strength properties for the tear-off function of the lever 46.

Of course, the construction can also be modified in such a manner that a forced rupture is also achieved without prior notching.

While the above description constitutes the preferred embodiment of the invention, it will be appreciated that the invention is susceptible to modification, variation, and change without departing from the proper scope or fair meaning of the accompanying claims.

What is claimed is:

1. A pedal arrangement for a footwell of a motor vehicle comprising:
    a bearing bracket operatively connected to a front wall of the motor vehicle on a side of the front wall which faces an interior of the motor vehicle;
    a pedal pivot shaft provided on the bearing bracket at an upper bracket segment thereof, the upper bracket segment being capable of being torn off from the remainder of the bearing bracket;
    at least one pedal lever arranged pivotally on the pivot shaft; and
    a tear-off lever element mounted to the bearing bracket and extending away from the front wall, the tear-off lever element being capable of being engaged with an abutment attached to the motor vehicle and spaced from a floor and the front wall of the motor vehicle;
    wherein, in the event of a collision causing the front wall to move the bearing bracket towards the interior of the motor vehicle and the tear-off lever element into engagement with the abutment, the upper bracket segment is at least partially torn away from the remainder of the bearing bracket such that the at least one pedal lever is displaced away from a driver.

2. The pedal arrangement according to claim 1, wherein the tear-off lever element comprises a double-armed lever having a first lever arm which is capable of engaging a first stop provided on the bearing bracket, the first stop being provided on the bearing bracket at a relatively low area thereof and remaining attached with the bearing bracket during the tearing away of the upper bracket segment.

3. The pedal arrangement according to claim 2, wherein the tear-off lever element comprises an upper surface which curves downwards towards an end portion of the tear-off lever element, the upper surface of the tear-off lever element engaging a curved surface of the abutment in the event of a collision.

4. The pedal arrangement according to claim 2, wherein the tear-off lever element is arranged pivotally on the pivot shaft.

5. The pedal arrangement according to claim 2, wherein a second stop is provided on the upper bracket segment of the bearing bracket in an area above the first stop, and the first lever arm of the tear-off lever element is arranged to pivot and contact the second stop and proceed to at least partially tear away the upper bracket segment along a predetermined rupture point in the event of a collision.

6. The pedal arrangement according to claim 5, wherein the tear-off lever element comprises two U-limbs and forms an inverted U-shaped cross-section which is arranged around a bearing bracket saddle of the bearing bracket, wherein each U-limb is capable of engaging the first stop and the second stop of the bearing bracket, the first stop and the second stop each comprising stop lugs protruding laterally from the bearing bracket.

7. The pedal arrangement according to claim 6, wherein at least one of the stop lugs of the first stop forms an abutment for fixing the at least one pedal lever in a non-depressed position.

8. The pedal arrangement according to claim 5, wherein the first lever arm of the tear-off lever element comprises a front projecting piece formed by two U-limbs, each of the U-limbs being arranged to engage under stop lugs protruding from the bearing bracket and comprising the second stop.

9. The pedal arrangement according to claim 8, wherein a spring element is arranged to continuously force the two U-limbs of the front projecting piece into engagement with the stop lugs of the second stop while stop lugs forming the first stop are simultaneously not engaged by the U-limbs of the front projecting piece.

\* \* \* \* \*